United States Patent [19]
Arenas

[11] 3,764,126
[45] Oct. 9, 1973

[54] CUTTING GUIDE
[76] Inventor: Gabriel N. Arenas, 328 Michigan Ave., Schenectady, N.Y. 12303
[22] Filed: Dec. 15, 1971
[21] Appl. No.: 208,118

[52] U.S. Cl............. 269/60, 83/411, 33/174, 269/71, 143/171, 143/88, 108/140, 108/150
[51] Int. Cl............................................. B23q 3/18
[58] Field of Search............... 33/174 TA, 174 TD; 269/55, 56, 57, 71, 77, 60; 108/140, 50, 150; 143/26, 86, 87, 90, 88, 59, 171; 144/3, 139

[56] References Cited
UNITED STATES PATENTS

| | | | |
|---|---|---|---|
| 3,106,111 | 10/1963 | Denisco | 269/71 X |
| 2,676,414 | 4/1954 | Derry | 33/174 TD |
| 2,400,062 | 5/1946 | Barrett | 33/174 TA |
| 1,575,354 | 3/1926 | Martin | 143/88 |
| 487,637 | 12/1892 | Niermann | 143/59 X |

Primary Examiner—Andrew R. Juhasz
Assistant Examiner—W. Donald Bray
Attorney—David S. Kane et al.

[57] ABSTRACT

A cutting guide for orienting an object in a predetermined spatial relationship with respect to a cutting means such as a saw blade includes a fixed base and an upright guide support reciprocally mounted to said base for movement toward and away from the cutting means. An upright open frame is connected to the guide support. The frame has an internal semicircular track. A platform is disposed in vertical alignment with the frame and spaced at least partially within the inner periphery of the frame. Means are provided connecting the frame and platform to permit the platform to be selectively rotated about its horizontal axis and vertical axis. Carriage means is movably connected to the platform for supporting the object to be cut. The carriage is adapted to be radially rotated about the face of the platform.

4 Claims, 18 Drawing Figures

PATENTED OCT 9 1973 3,764,126

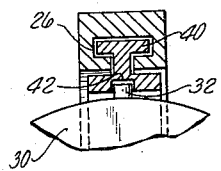
FIG. 8
FIG. 7
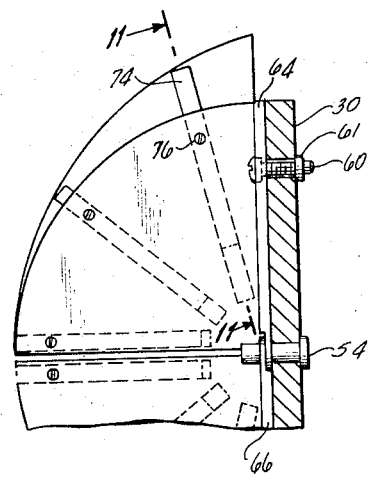
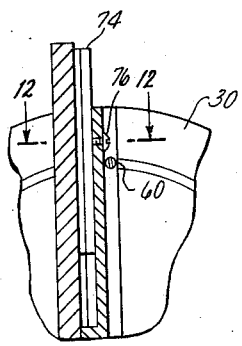
FIG. 11
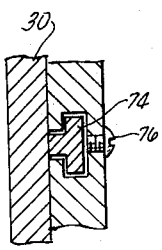
FIG. 12
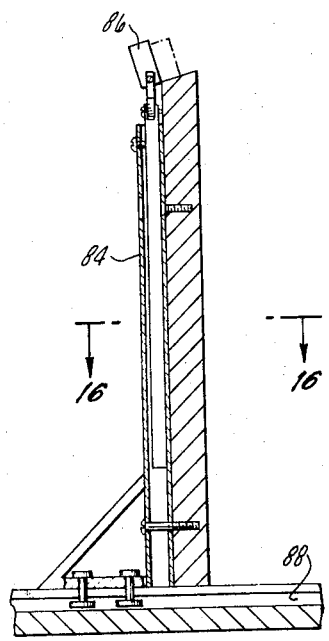
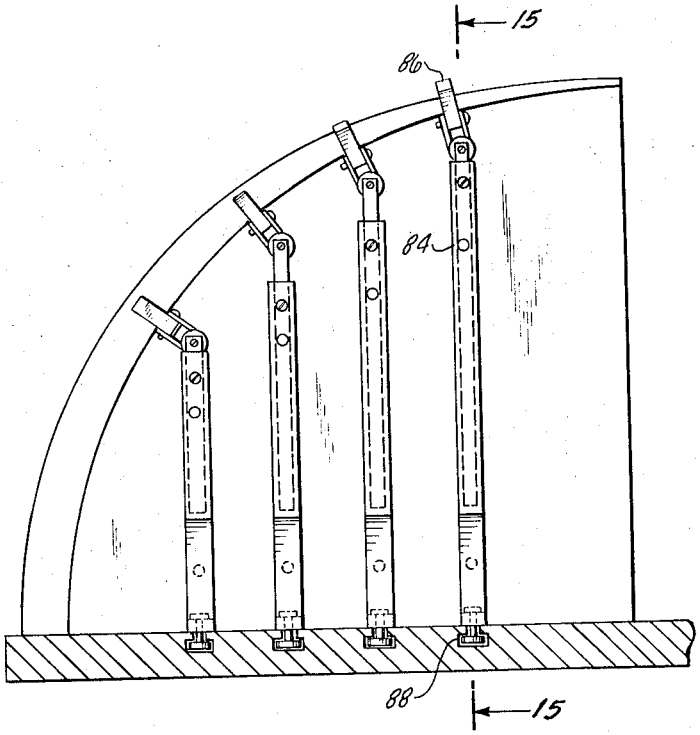
FIG. 15           FIG. 14

CUTTING GUIDE

BACKGROUND OF THE INVENTION

The invention relates to a device for use with saws and the like for cutting objects. In particular, it relates to a cutting guide for fabricating bending forms.

DESCRIPTION OF THE PRIOR ART

Previously, in order to form a convoluted edge on a bending form or the like of predetermined radius, pitch and edge angle, it was necessary to employ rather bulky, complicated and expensive cutting guides. Exemplary of such guides are those disclosed in U.S. Pat. No. 320,845 issued to Burnell; U.S. Pat. No. 454,426 issued to Campbell; and U.S. Pat. No. 487,637 issued to Niermann. The Burnell guide has only limited utility, as it is only adapted to cut a work piece to an edge having a cylindrical involute; that is, an edge whose inner surface bends to form a cylindrical surface of fixed radius. Burnell is not adapted to form an edge on a work piece of a conical involute; that is, an edge which forms a conical surface of either increasing or decreasing radius.

Campbell is directed to a turntable for sewing machines and is adapted generally to cut work pieces to a relatively straight edge. Campbell is not adapted to form work pieces having twisted or involuted edges. Niermann is directed to a wood turning and woodworking machine which is extremely bulky, difficult to operate and otherwise impractical.

Therefore, there exists a need to provide an easily operated cutting guide for forming wooden pieces having preselected convoluted edges for stair rails, saddletrees and for other purposes requiring curved, conical wooden edge surfaces.

Further, in the past, copper bars have been custom formed into stators for generators and other motors. The copper bars are required to be bent into surfaces having an involute, conical shape. Conventionally, the stators were formed by bending the copper bars over custom-made, wooden forms. The wooden forms were previously made by cutting individual, curved wooden strips into a desired involute conical configuration. Generally, 20 or more wooden strips were individually cut and glued together to form a platform support. The platform support had two complimentary matched forms at each end. The copper bars were thereafter bent over the forms into the required shape. This procedure is expensive, difficult, and very wasteful of valuable man hours.

Accordingly, there exists a longfelt need for developing an easily operated and inexpensive apparatus for cutting wooden pieces into a desired involute, conical shape for use as a form for copper and other metal bars.

It is, therefore, a primary object of this invention to provide a new and improved cutting guide for forming convoluted wooden pieces for use as stair rails, saddletrees and the like.

It is another object of the invention to provide an inexpensive, easily operated and simple apparatus for orienting an object in a predetermined spatial relationship with respect to a cutting saw blade to provide an edge of predetermined radius, edge angle and pitch on said object.

It is yet another object of the invention to provide a cutting guide for forming a pair of complimentary wooden forms having edges of a predetermined involute, conical configuration which are adapted to be employed as bending guides for forming copper bars and the like into stators and the like.

SUMMARY OF THE INVENTION

The above and other objects are obtained in a cutting guide for orienting an object in a predetermined spatial relationship with respect to a cutting means, such as a band saw blade comprising a fixed base and an upright guide support reciprocally mounted to said base for movement toward and away from said cutting means. An upright open frame is connected to the guide support, said frame having an internal semicircular track. A platform is in vertical alignment with the frame and spaced at least partially within the inner periphery of the frame. Means are provided connecting the frame and platform to permit the platform to be selectively rotated about its horizontal and vertical axes. Carriage means is movably connected to the platform for supporting the object to be cut. The carriage means is adapted to be radially rotated about the face of the platform.

BRIEF DESCRIPTION OF THE DRAWINGS

In the drawings like reference characters designate similar parts in the several views.

FIG. 3 is a side view of the cutting guide of FIG. 1;

FIG. 4 is an enlarged, fragmentary cross-sectional view taken along line 4—4 of FIG. 1 and illustrating a mechanism for indexing the platform;

FIG. 8 is an enlarged cross-sectional view taken along line 8—8 of FIG. 3 illustrating the mechanism which permits the platform to be selectively rotated about its vertical axis;

FIG. 9 is a cross-sectional view taken along line 9—9 of FIG. 3 and illustrating a tracked guide and runner for reciprocally moving the cutting guide toward and away from the saw blade;

FIG. 10 is a cross-sectional view taken along line 10—10 of FIG. 3 and showing a cranking mechanism for vertically adjusting the apparatus;

FIG. 11 is a fragmentary, cross-sectional view taken along line 11—11 of FIG. 7 showing the telescoping arm supports;

FIG. 12 is an enlarged, fragmentary, cross-sectional view taken along line 12—12 of FIG. 11;

FIG. 14 is a perspective view of a supported wooden form prepared in the cutting guide of the invention ready to be used as a bending form.

FIG. 15 is a cross-sectional view of the wooden form taken along line 15—15 of FIG. 14.

DESCRIPTION OF PREFERRED EMBODIMENTS

Figure 1:
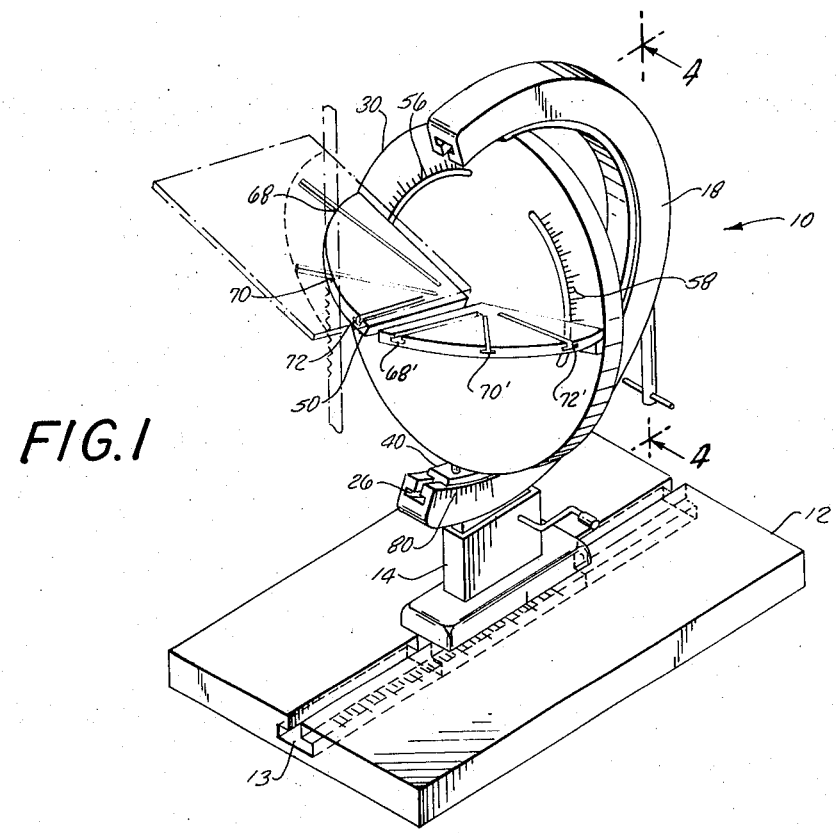
FIG. 1 is a perspective view of the cutting guide of the invention illustrating the positioning of an object to be cut with respect to a band saw blade.
Figure 2:
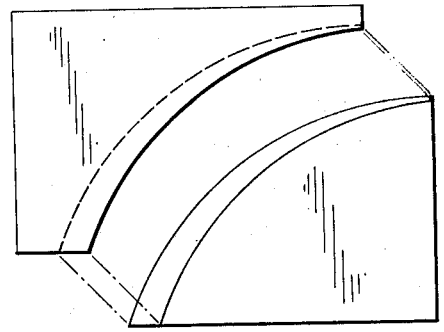
FIG. 2 is a perspective view of the involute, conical edge formed by a cutting saw blade when oriented in the apparatus of the invention.
Figure 6:
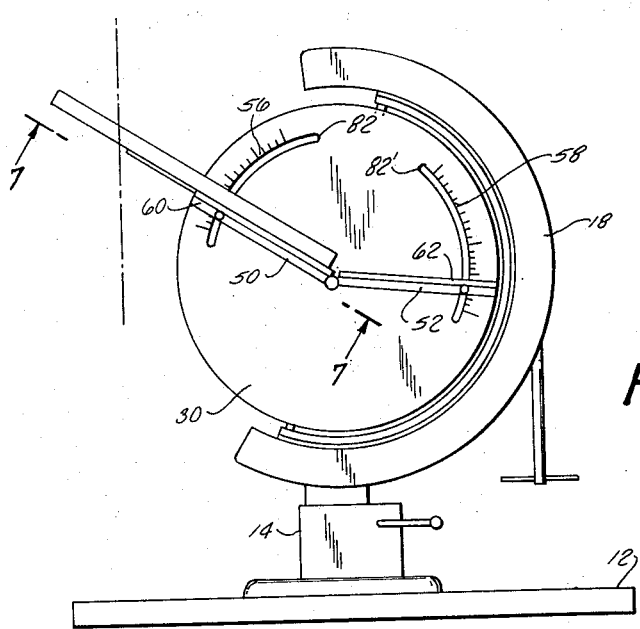
FIG. 6 is a side view of the cutting guide of the invention wherein the supporting platform has been selectively rotated about its vertical axis with respect to FIG. 3.

Referring now to the drawings and, more particularly, to FIG. 1, there is illustrated a cutting guide of the invention. The cutting guide is fully adjustable to selectively position an object to be cut to any of four, dimensional parameters. The cutting guide may be regulated to form a generally arcuate and preferably circular edge on an object to be cut. The cutting guide is adapted to form a pre-selected radius for the curved surface on the object to be cut. The edge angle of the object may be pre-selected in a range of from 0° to 90°. Further, the cutting guide is adapted to form a specified degree of twist (angular displacement) of the curved edge of the object. The guide is adapted to form either a cylindrical twist (screw thread) or a conical twist (involute) to the edge.

Referring now to FIGS. 1, 3, 6, 9 and 10 cutting guide 10 includes a fixed base 12. Base 12 has a centrally spaced dove-tail track 13 located therein.

Upright guide support 14 is reciprocally connected to dove-tail track 13 by means of guide rail 16 integrally connected to the bottom guide support 14. As illustrated in FIG. 9, guide rail 16 is slidably mounted within dove-tail guide 13.

Upright open frame 18 is connected to guide support 14. As illustrated in FIGS. 3 and 10, frame 18 is vertically adjustable with respect to guide support 14 by means of a rack and pinion gear arrangement 20. The rack and pinion gear is actuated by means of lever 22 connected to pinion gear 24. If desired, frame 18 may be fixedly connected to support 14.

Frame 18 is preferably in the form of a generally semicircular C-frame having a dove-tail track 26 spaced along its inner periphery 28.

Circular platform 30 is mounted within the inner periphery 28 of frame 18. At diametrically opposite ends of platform 30 are spaced protruding bosses 32, 34. Bosses 32 and 34 are connected to frame guide rail 40 which is movably mounted within frame dove tail track 26 by means of a T shaped rail.

As illustrated more particularly in FIG. 8 bosses 32 and 34 are fixedly connected to platform 30. Bosses 32 and 34 are held against lateral movement within rail guide 40 and are permitted rotational movement within their respective rail mounting notches 42, 44.

Figure 5:
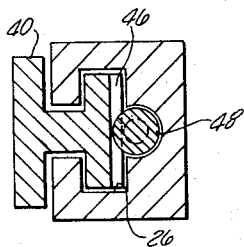
FIG. 5 is an enlarged cross-sectional view of the indexing mechanism taken along line 5—5 of FIG. 4.

In order to provide positive control for the selective positioning of platform 30 with respect to frame 18, worm gear arrangement 46 is employed. As illustrated in FIGS. 4 and 5, a restricted peripheral portion of guide rail 40 is provided with a series of spaced apart gear teeth 48. The gear teeth are adapted to mesh with the flights of worm gear 46.

Figure 7:
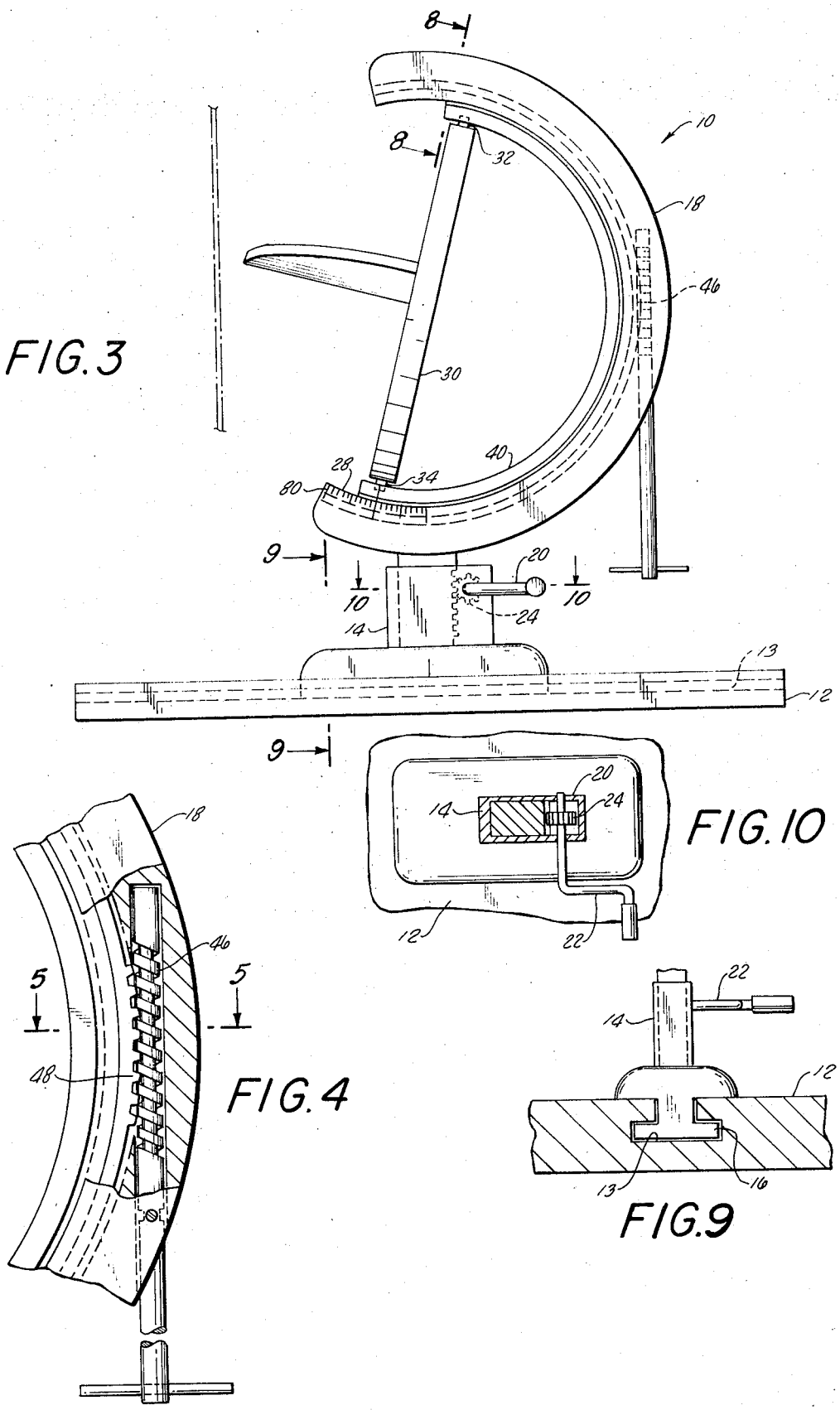
FIG. 7 is an enlarged, fragmentary, cross-sectional view taken along line 7—7 of FIG. 6 illustrating the use of telescopic supports on the carriage supporting the object to be cut.

A pair of complimentary, spaced apart carriage plates are pivotally connected to platform 30 and extend in a perpendicular direction from the face of platform 30. As seen in FIG. 7, plates 50 and 52 are pivotally connected to platform 30 by centrally spaced friction bolt 54. Bolt 54 is preferably formed of steel and plastes 50 and 52 of aluminum or other light sturdy material.

A pair of oppositely disposed arcuate slots extend through platform 30 near the outer periphery of each of the respective carriage plates. Slots 56, 58 are of sufficient width to permit adjustable mounting bolts 60, and 62 to extend therethrough. To provide a mounting surface for bolts 60, 62 and for plates 50 and 52, a pair of shoulders 64, 66 integral with plates 50, 52 extend for a short distance parallel to platform 30. As illustrated in FIG. 7, mounting bolts 60, 62 extend through each of the shoulders 64, 66 and through one of said slots 56, 58 in the platform. An adjustable nut 61, 61 is provided for the mounting bolts in order to permit the mounting bolts to be tightened and loosened to selectively position each of the carriage plates.

Each of the carriage plates is provided with a set of telescoping members in order to accommodate and support objects of various sizes. As illustrated more particularly in FIGS. 1, 7, 11 and 12, each of the carriage plates is provided with three radially spaced dovetail tracks 68, 70, 72 and 68', 70', and 72'. The tracks are spaced on the upper face of the carriage plates. Slidingly mounted in each of said dove-tail tracks is a telescoping rail 74. A set screw 76 is provided for each track. The set screw extends from the bottom of the carriage plate and into the dove-tail track. By tightening or loosening the set screw the supporting rail 74 may be selectively horizontally extended, retracted or fixed against further movement.

In operation, an object to be cut to a predetermined radius, edge angle and edge pitch is placed on the carriage plate(s). For the purposes of illustrating the operation of the apparatus of the invention there is illustrated the cutting of a pair of complimentary wooden forms. As illustrated diagramatically in FIG. 1 and FIG. 13A, the forms are placed on each of the carriage plates 50, 52. In order to provide increased support for the boards, selected set screws 76 are loosened in order to permit the telescoping rails 74 to be extended from their mounting tracks. Generally the supporting rails are extended to a distance less than the desired radius of the cut form.

Next, worm gear 46 is rotated in order to adjust the angle of attack of the platform 30. This movement regulates the angle at which the board will meet the cutting blade (shown in phantom lines) and determines the edge angle on the board. To aid in this indexing movement a scale 80 is provided on the side of frame 18 adjacent the bottom edge. The end of the scale is adjusted to be at the lowermost portion of the semicircumference of the frame. This lowermost portion denotes the point at which the platform is located at a 90° angle with respect to a local horizontal. As platform 30 is indexed along track 26 of frame 18 as shown in FIG. 1 and 3, the angle of initial attack of the board to the band saw blade changes from 90° to an angle less than 90°.

After the edge angle adjustment has been completed, carriage bolts 60 and 62 are loosened to permit adjustment of carriage plates 50 and 52. Carriage plates 50 and 52 are selectively positioned from their normal horizontal position to a selected angular position in order to impart the desired twist or pitch to the board edge. To assist in this function a scale 82, 82 is provided along the upper edge of each of slots 56 and 58. The adjustment is made so that the boards supported by each plate are tilted at identical angles with respect to a local horizontal.

Next, the height of the cutting guide 10 is vertically adjusted in order to orient it in the proper plane to meet the cutting blade of the band saw. This is accomplished by cranking lever 22 which operates to move pinion gear 20 along rack 25.

Finally, the cutting guide is moved horizontally along track 13 to the desired position. Movement along track 13 will determine the radius of the form to be cut. As the cutting guide is moved closer to the band saw blade, the radius of the cut form will decrease. Conversely, as the cutting guide is moved further away from the blade, the radius of the form, as illustrated by the dotted line appearing on the board in FIG. 1, will increase.

Figure 13A:
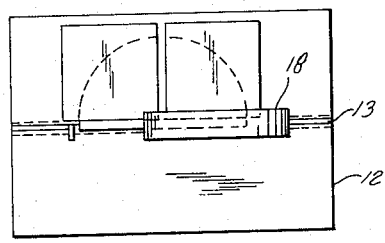
FIG. 13A—13C illustrate the radial movement of the platform by which a pair of objects to be cut are sequentially passed through the plane of a band saw blade.
Figure 13B:
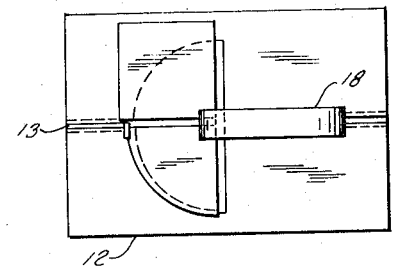
Figure 13C:
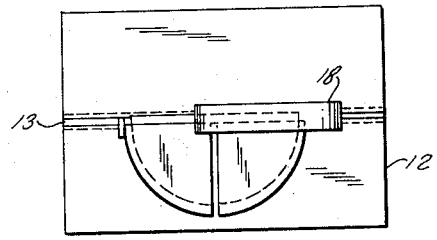

In order to initiate the cutting operation, platform 30 is rotated about bosses 32 and 34 until the objects to be cut are located entirely to one side of the cutting blade. This operation is seen in FIG. 13A. Thereafter, the platform is rotated through a 180° arc in order to bring the objects to be cut into contact with the band saw blade. This operation is seen in FIGS. 13B and 13C. Thereafter, the prepared forms are removed from the cutting guide.

Since it may be necessary to change the height of the cutting surface of the band saw to meet the board as it passes through the cutting plane, the band saw may be provided with hydraulic or mechanical means to raise and lower the band saw itself or only the blade guides. Whichever conventional system is adopted, it is generally preferred to control the system by means of microswitches installed on the guides of the saw blade. When the operator feeds the board against the saw blade, the corresponding microswitches are activated to give vertical motion to the guide or the machine. In the event that the cutting operation is interrupted the microswitches will be activated when the cutting guide is withdrawn with respect to the band saw blade and thereby stop the machine. To start the operation the cutting guide is again moved forward and when the board to be cut touches the micro-switch again, the saw guides will be actuated.

Figure 16:
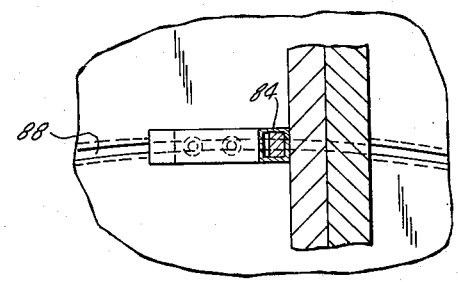
FIG. 16 is a fragmentary, vertical cross-sectional view of the supported form taken along line 16—16 of FIG. 15.

The previously described apparatus is particularly useful in cutting from scrap wood stock and the like a curved wooden form of predetermined radius, edge angle and edge twist. Such a form, when combined with proper supports is employed as a guide for bending a metal sheet to a desired contoured surface. As previously described, the device is particularly useful for simultaneously orienting a pair of boards to be cut into a pair of complimentary forms. Matched pairs of such forms are mounted as illustrated in FIG. 14–16 on a wooden base and supported by telescoping supports. As shown in FIG. 14, each telescoping support 84 is supplied with an articulated head 86 which is adapted to form a right angle with the cut board. Generally at least four supports are employed per board for proper support.

The base for the telescoping supports has a series of grooved tracks 88 as shown in FIG. 16. The supports may be moved in the tracks to adjust the board to a desired angle to conform to the surface geometry of the desired metal sheet.

As is evident, the cutting guide and its templates in the form of wooden forms may be cheaply produced and thereby lends themselves to low production runs and the like. The versatility of the cutting guide is evident in that an object to be cut may be oriented with respect to every possible cutting plane. The ease of operation of the cutting guide and its simplicity lends itself to use by relatively unskilled personnel.

Certain preferred embodiments of the invention have been disclosed, however the invention is not to be limited except as set forth in the following claims:

Wherefore, I claim:

1. A cutting guide for orienting an object in a predetermined spatial relationship with respect to a cutting means, such as a band saw blade, comprising:
   a. a fixed base;
   b. an upright guide support reciprocally mounted to said base for movement toward and away from said cutting means;
   c. an upright open frame connected to said guide support, said frame having an internal semi-circular track;
   d. a platform in vertical alignment with said frame and spaced at least partially within the inner periphery of the frame;
   e. means connecting the frame and platform to permit the platform to be selectively rotated about its horizontal and vertical axes and
   f. carriage means movably connected to said platform for supporting the object to be cut, said carriage means adapted to be radially rotated about the face of the platform.

2. The invention in accordance with claim 1 wherein said frame is vertically adjustable with respect to said guide support.

3. The invention in accordance with claim 1 wherein said carriage means contains a plurality of telescoping arms adapted to be moved toward and away from said platform to support said object during cutting.

4. A cutting guide for orienting an object in a predetermined spatial relationship with respect to a cutting means, such as a band saw blade in order to form an arcuate edge on said object of predetermined radius, predetermined edge angle and predetermined edge pitch comprising:
   a. a fixed base having an open horizontal track;
   b. an upright guide support having a runner adapted for reciprocal motion in said track;
   c. an upright open C frame having an internal semi-circular track;
   d. means connecting said guide support and upright frame adapted to move said frame toward and away from said guide support;
   e. a circular platform vertically aligned with said frame and spaced at least partially within the inner periphery of said frame, said platform having a pair of bosses diametrically opposed on the periphery of said platform;
   f. a C-shaped rail adapted for movement within said semi-circular track, said rail adapted to receive each of said bosses and hold said bosses against lateral movement and permit rotation of said bosses about said vertical axes of said bosses;
   g. first and second carriage plates pivotally connected to said platform extending normal to the plane of said platform;
   h. means for adjustably positioning each of said plates at a predetermined angle with respect to a local horizontal; and
   i. a plurality of radially extending telescoping arms in each of said plates for supporting said object to be cut.

* * * * *